(No Model.) 9 Sheets—Sheet 1.
L. PERKINS.
REFRIGERATING AND FREEZING APPARATUS.
No. 439,181. Patented Oct. 28, 1890.
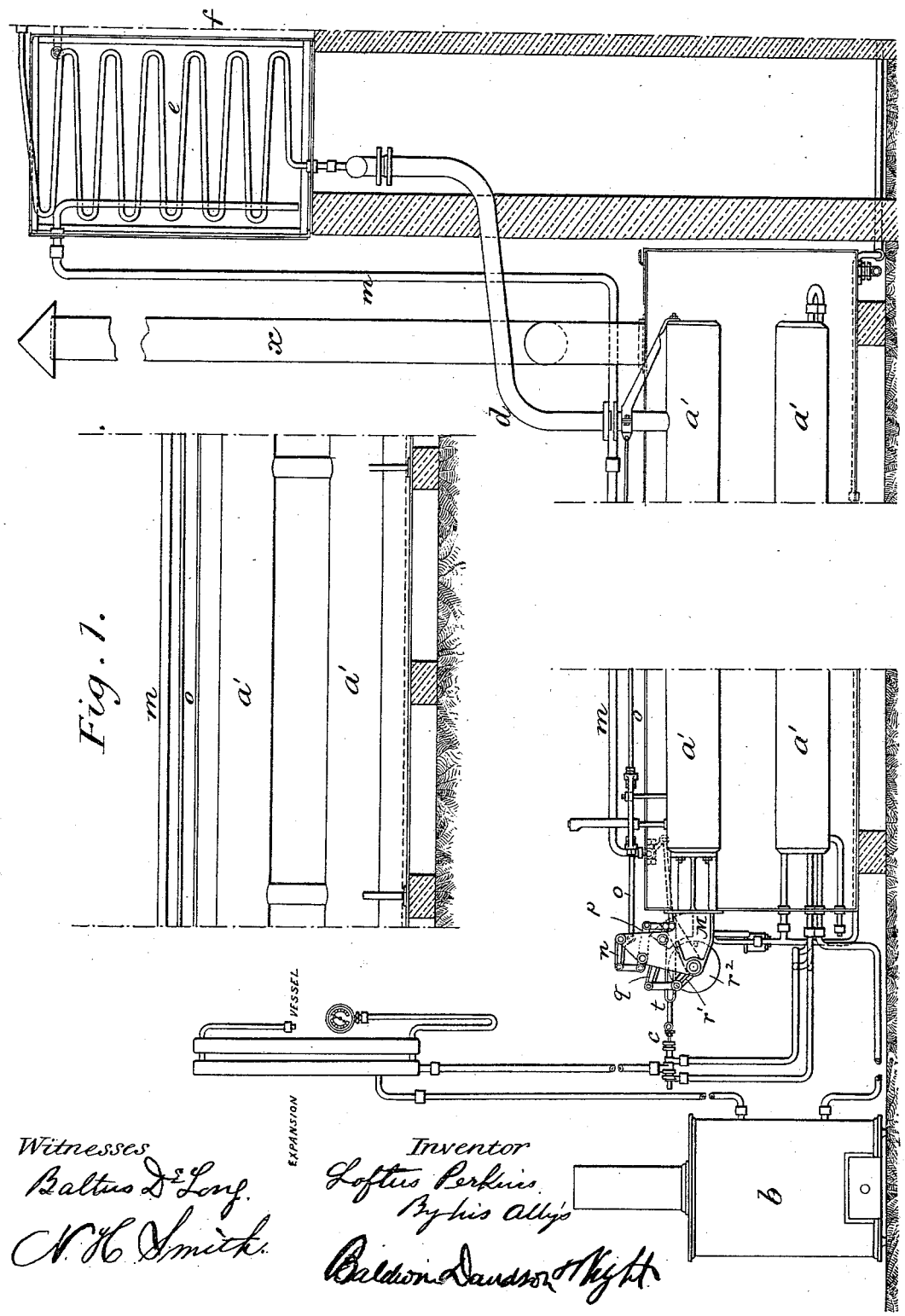
Witnesses
Baltus DeLong
N. H. Smith
Inventor
Loftus Perkins
By his Atty's
Baldwin Davidson & Wight (No Model.)　　　　　　　　　　　　　　　　9 Sheets—Sheet 2.
L. PERKINS.
REFRIGERATING AND FREEZING APPARATUS.
No. 439,181.　　　　　　　　　Patented Oct. 28, 1890.
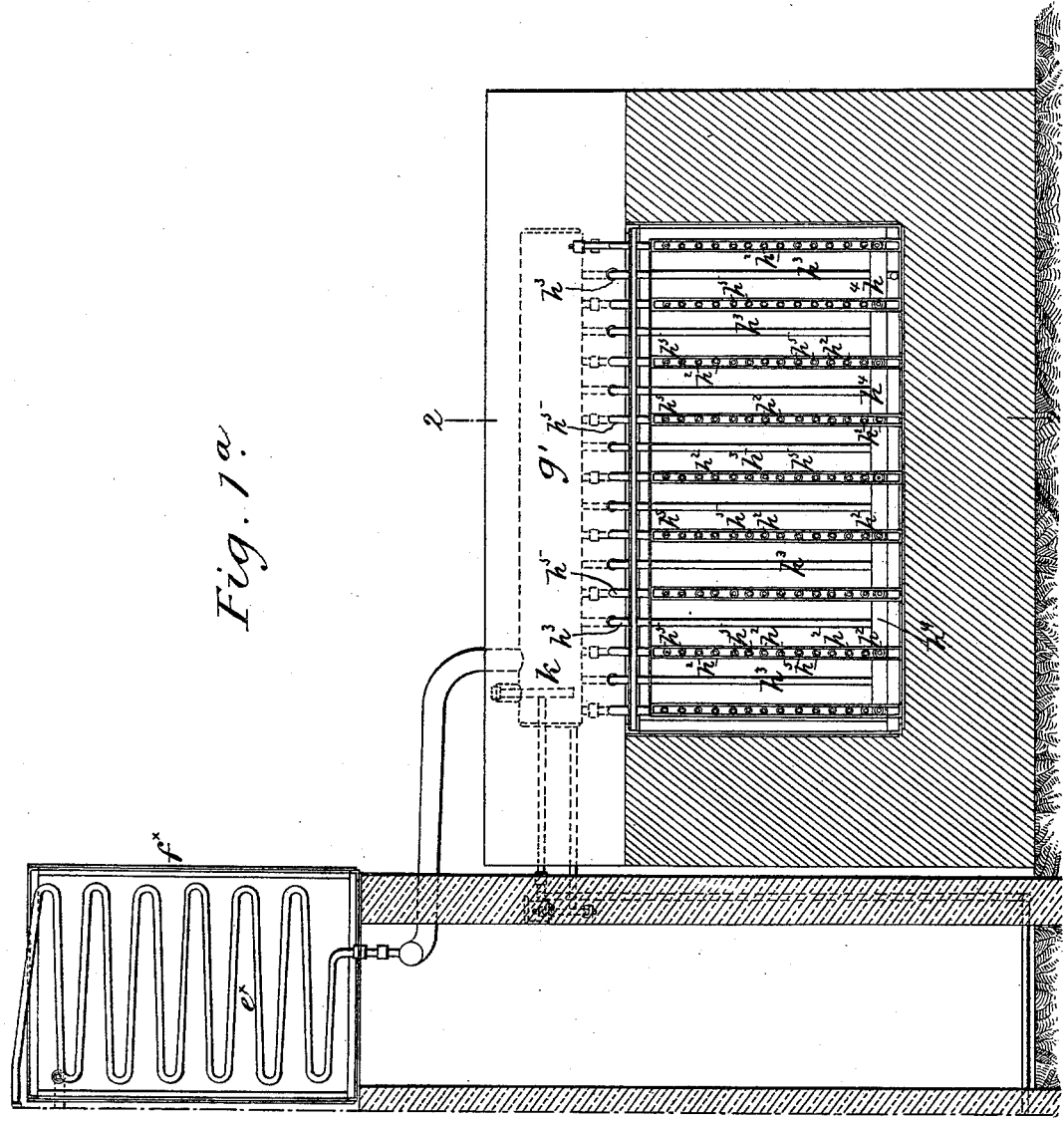
Witnesses　　　　　　　　　　　　　　Inventor
Baltus D. Long　　　　　　　　　　　Loftus Perkins.
N. H. Smith.　　　　　　　　　　　　By his Attys.
　　　　　　　　　　　　　　　　Baldwin, Davidson & Wight (No Model.) 9 Sheets—Sheet 3.
L. PERKINS.
REFRIGERATING AND FREEZING APPARATUS.
No. 439,181. Patented Oct. 28, 1890.
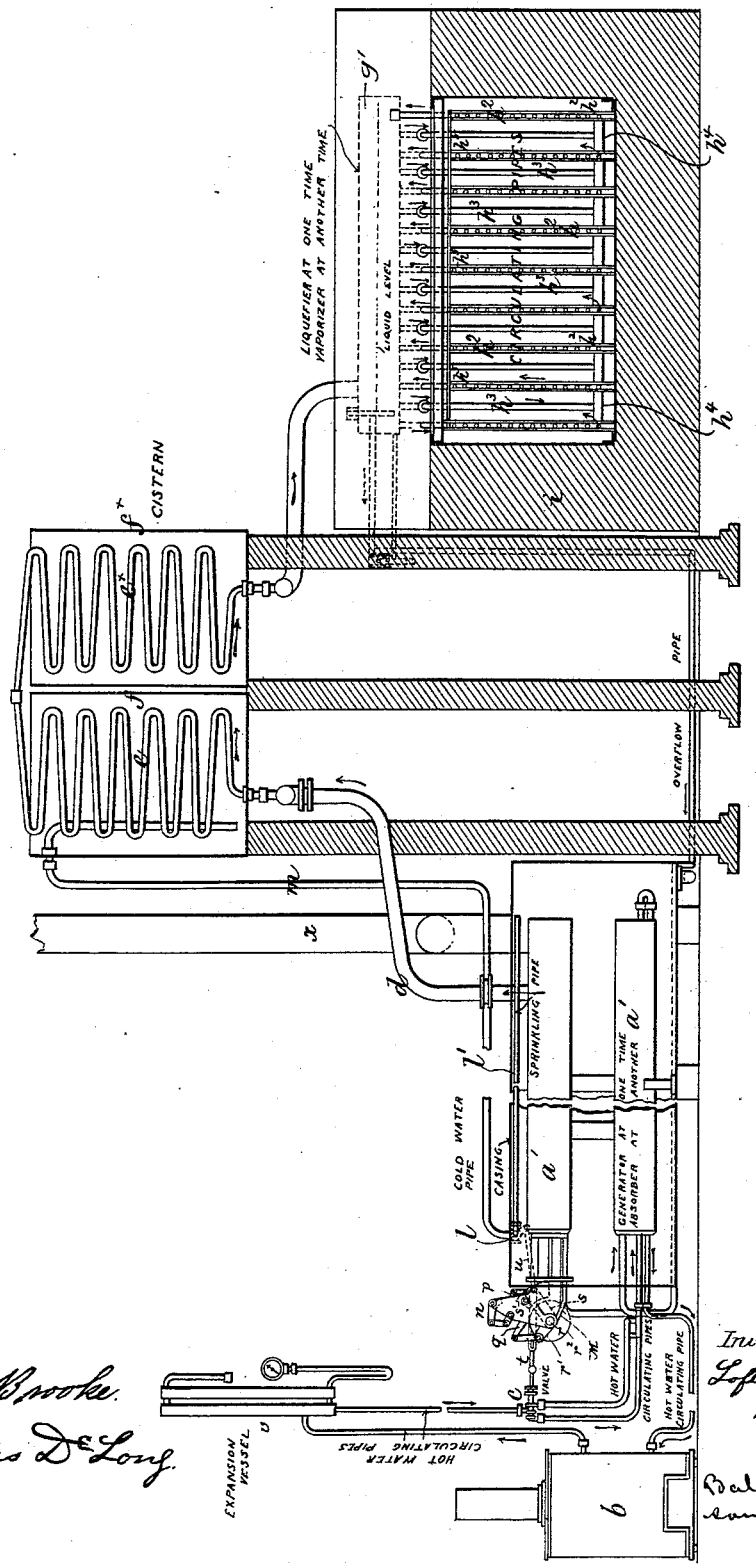

(No Model.) 9 Sheets—Sheet 4.
L. PERKINS.
REFRIGERATING AND FREEZING APPARATUS.
No. 439,181. Patented Oct. 28, 1890.
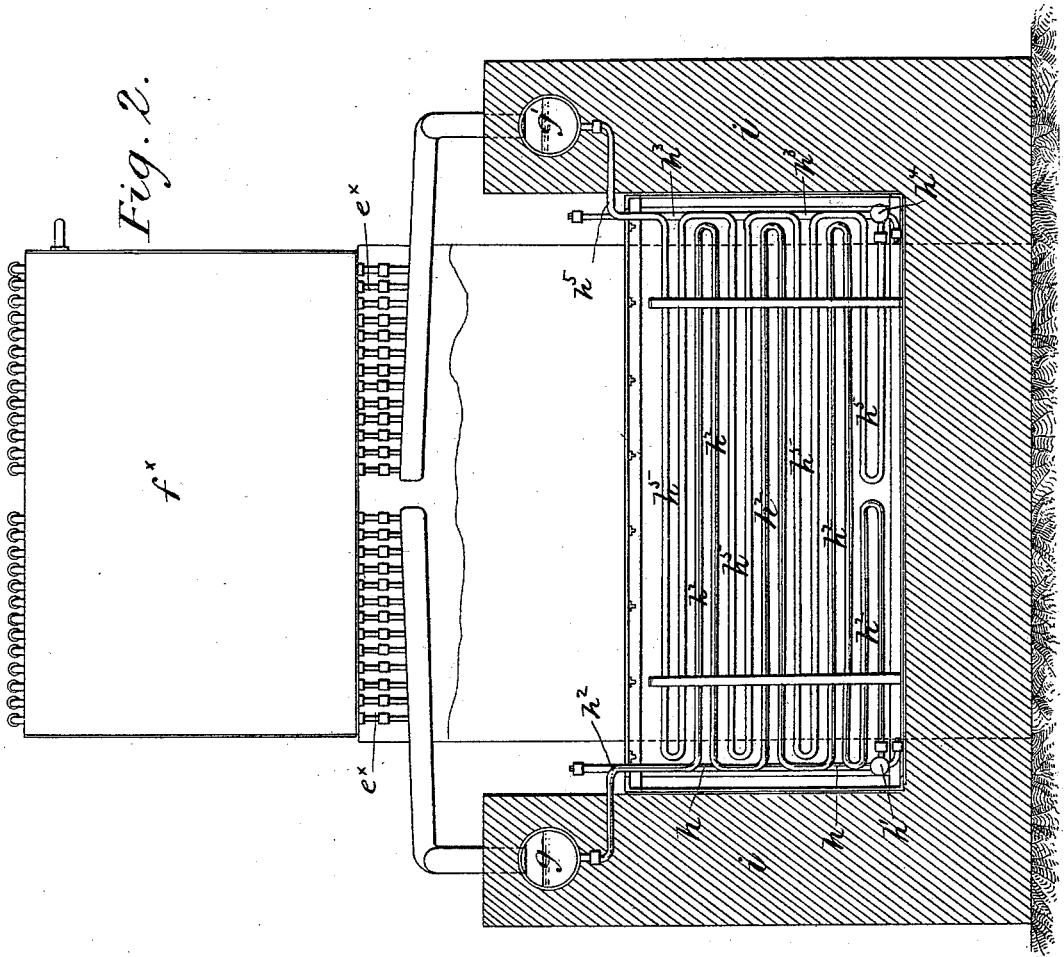

(No Model.) 9 Sheets—Sheet 5.
L. PERKINS.
REFRIGERATING AND FREEZING APPARATUS.
No. 439,181. Patented Oct. 28, 1890.
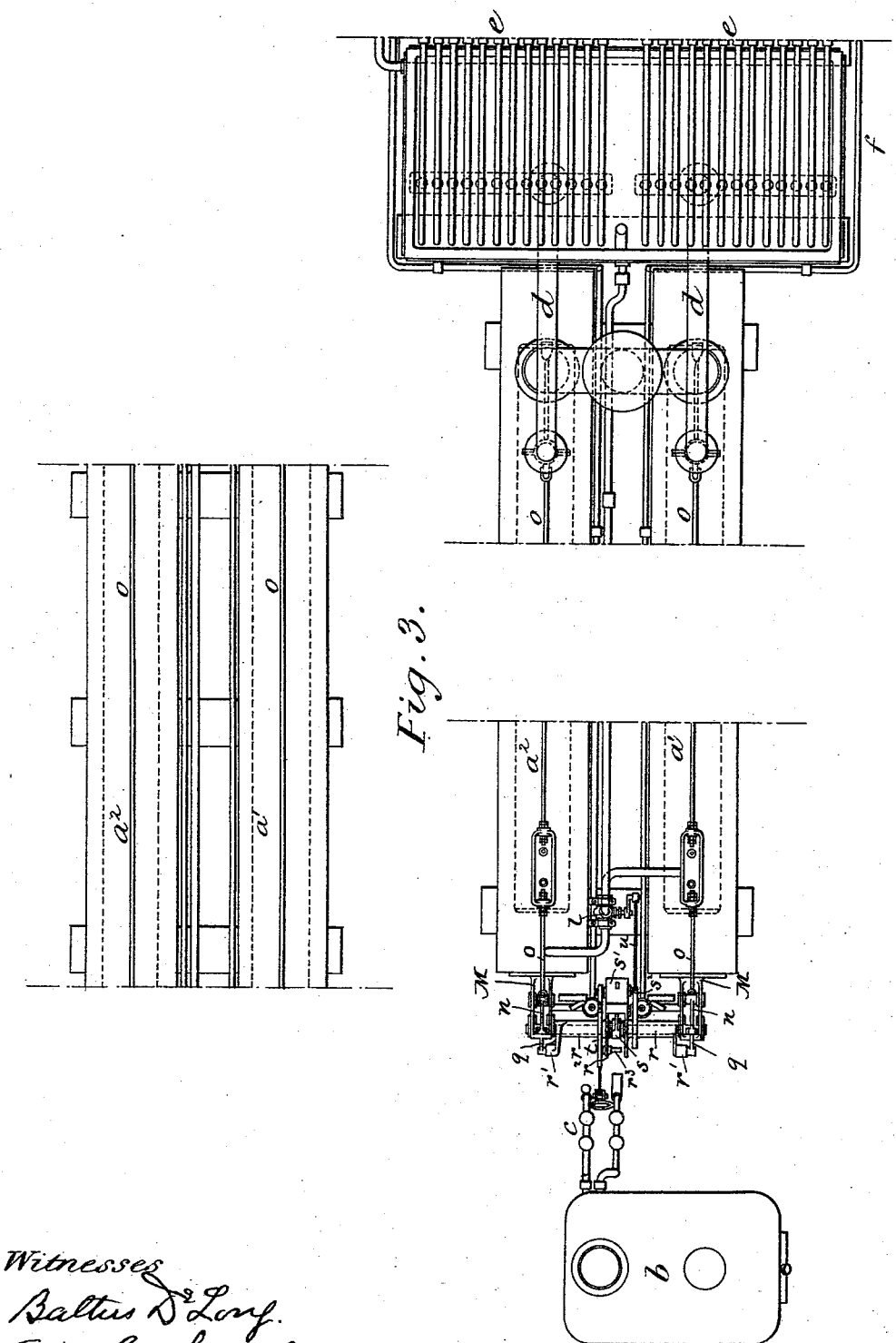
Witnesses
Baltus D. Long.
N. H. Smith.
Inventor
Loftus Perkins
By his attys.
Baldwin, Davidson & Wight (No Model.) 9 Sheets—Sheet 6.
L. PERKINS.
REFRIGERATING AND FREEZING APPARATUS.
No. 439,181. Patented Oct. 28, 1890.
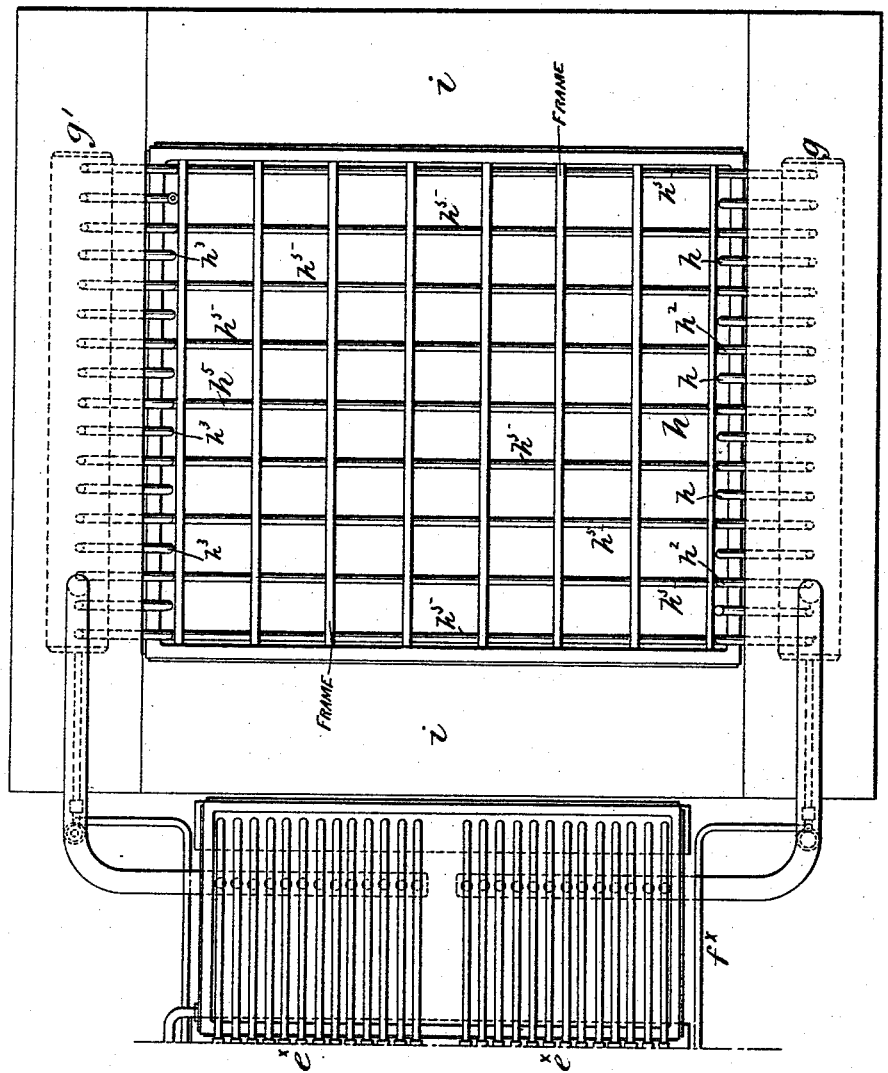

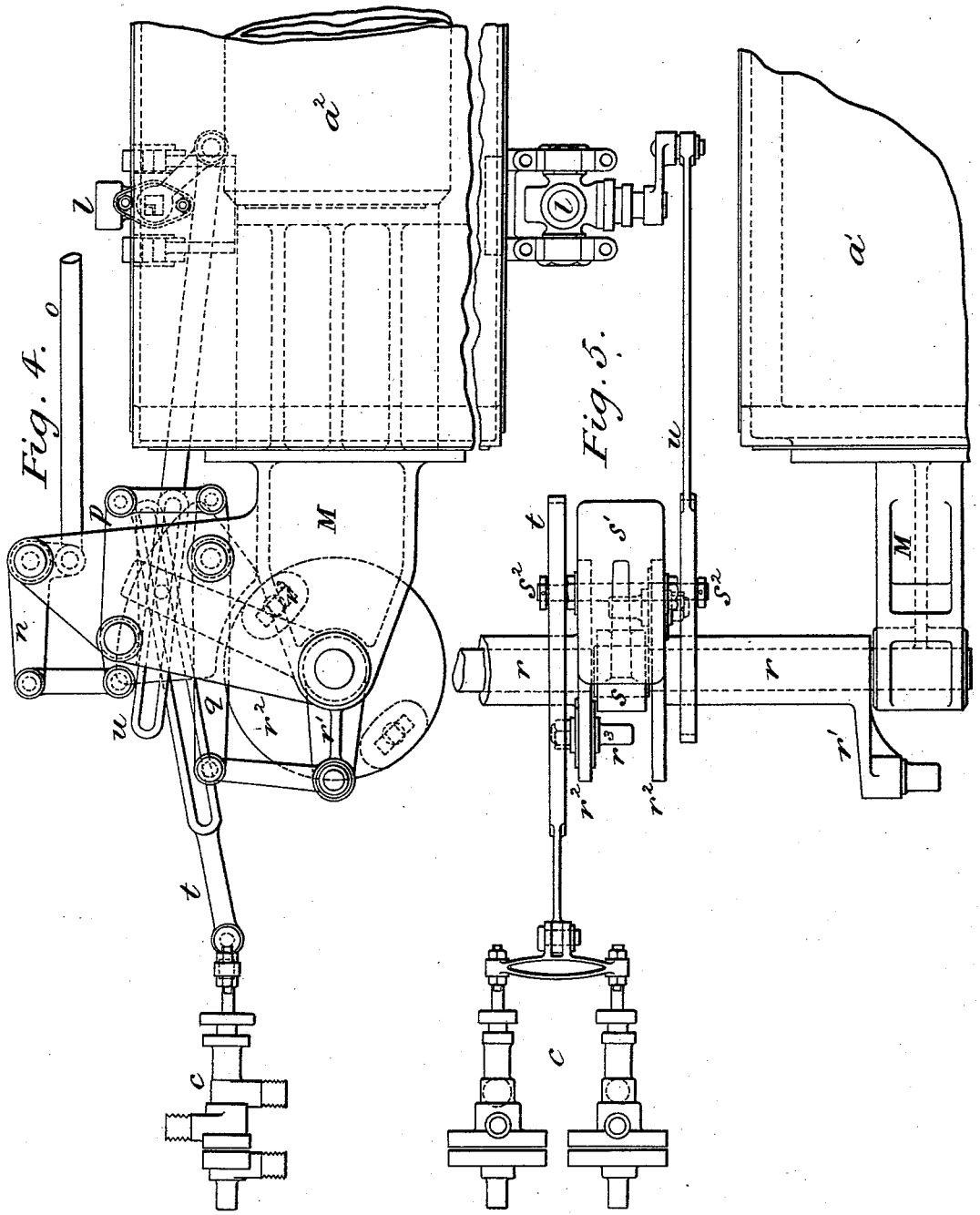

(No Model.) 9 Sheets—Sheet 8.
L. PERKINS.
REFRIGERATING AND FREEZING APPARATUS.
No. 439,181. Patented Oct. 28, 1890.
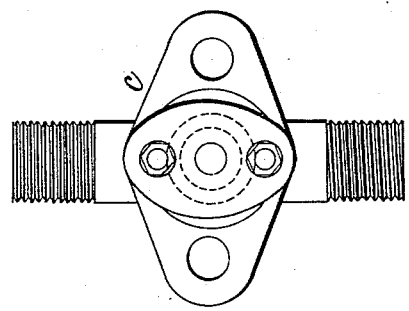
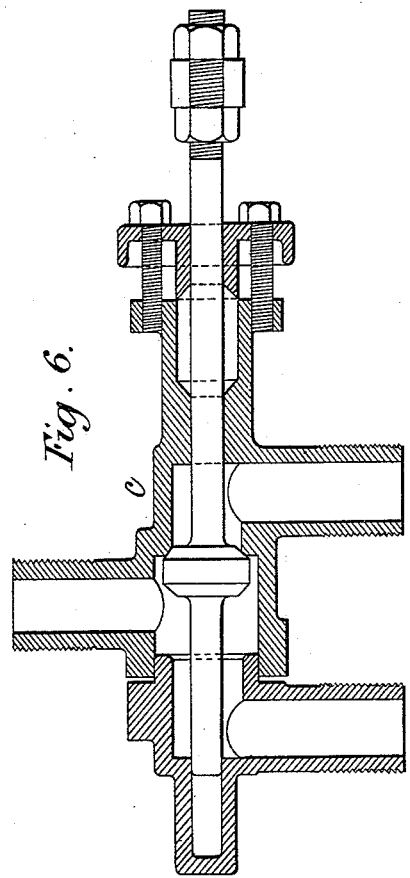
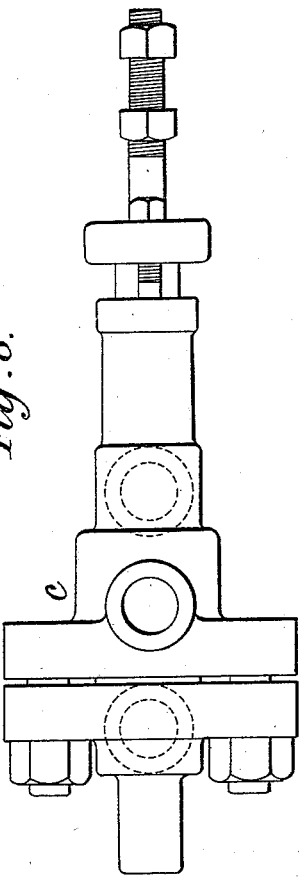

(No Model.)  9 Sheets—Sheet 9.
L. PERKINS.
REFRIGERATING AND FREEZING APPARATUS.
No. 439,181. Patented Oct. 28, 1890.
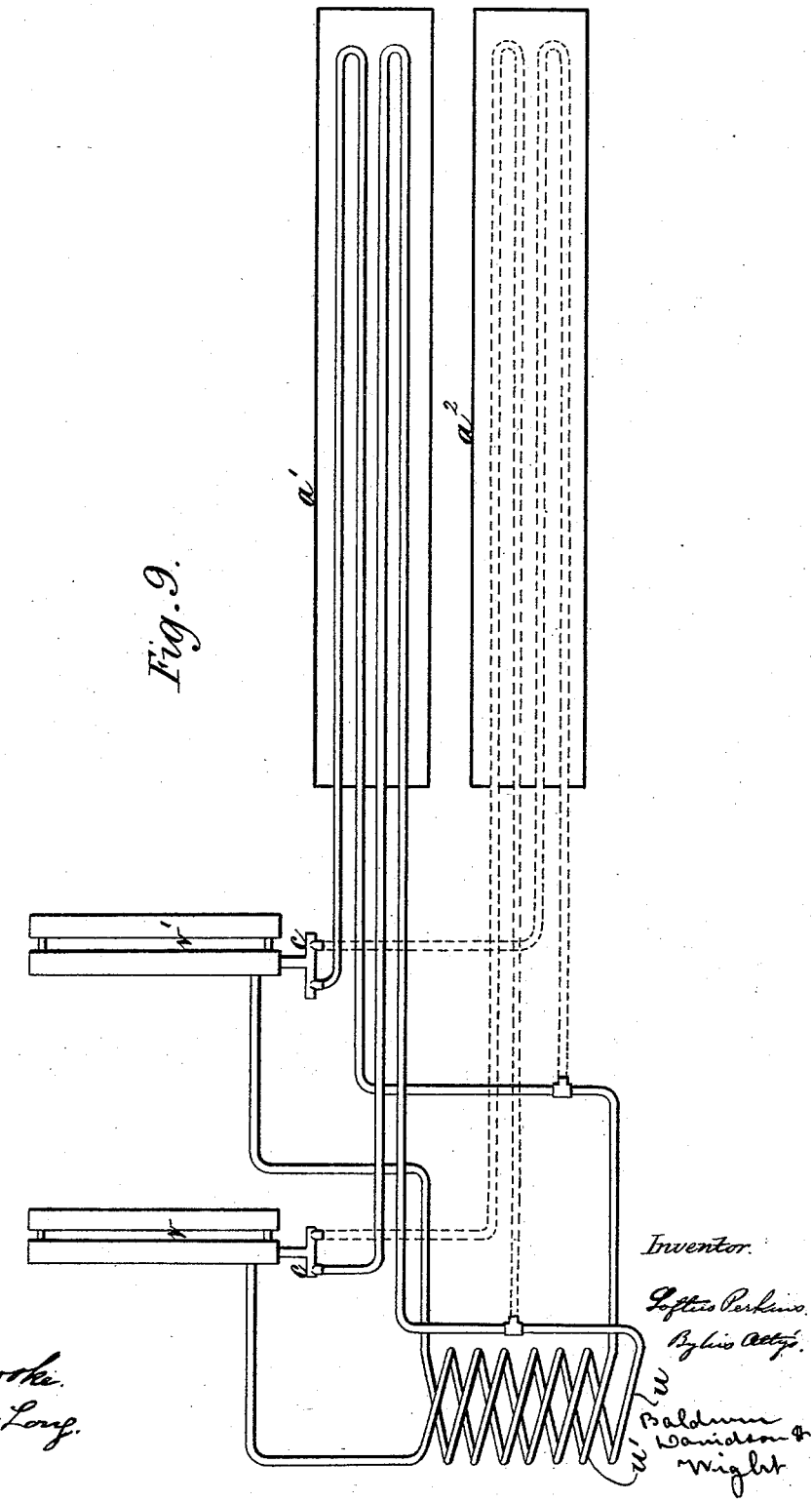

UNITED STATES PATENT OFFICE.

LOFTUS PERKINS, OF LONDON, ENGLAND.

REFRIGERATING AND FREEZING APPARATUS.

SPECIFICATION forming part of Letters Patent No. 439,181, dated October 28, 1890.

Application filed October 22, 1889. Serial No. 327,768. (No model.)

*To all whom it may concern:*

Be it known that I, LOFTUS PERKINS, engineer, a subject of the Queen of Great Britain, residing at 6 Seaford Street, Gray's Inn Road, in the county of Middlesex, England, have invented certain new and useful Improvements in Refrigerating and Freezing Apparatus, of which the following is a specification.

This invention has for its object improvements in refrigerating and freezing apparatus, and it applies more especially to apparatus such as is described in the specification of a former United States patent issued to me on the 9th day of March, 1889, No. 399,207, in which two operations are alternately performed, as follows: In the first place, in one part of the apparatus, which I will call the "generator," a gas—such as ammonia—is separated by the aid of heat from water or other matter having an affinity for it, while in another part of the apparatus, which I will call the "liquefier," the gas which has been previously cooled is liquefied under pressure; and afterward, in the second place, the heat is withdrawn from the water or other matter, thereby reducing the pressure within the apparatus and permitting the liquefied gas to evaporate and to return to and be absorbed by the water or other matter. Now, in order to utilize the low temperature resulting from the evaporation of the liquefied gas, I provide the liquefier with a circulating system. This circulating system consists, preferably, of coils of pipes descending from the bottom of the liquefier and passing back to it and arranged within the chamber to be cooled. The coils of pipe and the lower part of each of the liquefiers are filled with a strong solution of the liquefied gas. When gas is driven from one of the generators and liquefied in one of the liquefiers, it either floats on the surface of the solution at the lower part of the liquefier or is absorbed in it. When the liquid in said liquefier is allowed to vaporize, the heat necessary to admit of its doing so passes to the liquid through the pipes of the circulating system, and in this way a circulation of the liquid in the circulating system and liquefier is set up, the liquid from the liquefier flowing through the coils, leaving the liquefier by one branch and returning to it by another. I also so arrange the apparatus that the alternate heating and cooling of the generator is automatically controlled; and, further, I render the operation continuous, so far as the withdrawal of heat from the cooling-chamber is concerned, by providing two apparatus so controlled by automatic appliances that when one generator has become sufficiently heated it is disconnected from the source of heat, and at the same time heat is applied to the other generator, so the two generators are worked alternately. The subject-matter claimed is hereinafter specified.

In order that my said invention may be fully understood and readily carried into effect, I will proceed to describe the drawings hereunto annexed.

In the drawings, Figures 1 and 1$^a$ represent a longitudinal vertical section of the apparatus constructed in accordance with my invention. Fig. 1$^b$ is a longitudinal section, on a smaller scale, of the whole of the apparatus. Fig. 2 is a transverse vertical section on the line 2 2 in Fig. 1$^a$. Figs. 3 and 3$^a$ represent a plan. Figs. 4 and 5 show some of the details to a larger scale, Fig. 4 being a side elevation and Fig. 5 a plan. Fig. 6 is a section of one of the hot-water-circulation valves $c$. Fig. 7 is an end view, and Fig. 8 a plan view, of the same. Fig. 9 is a diagrammatic view of the system of hot-water pipes used for alternately-heating the two generators.

$a'$ and $a^2$ are the two generators, in all respects similar the one to the other. Each generator consists of two cylinders, an upper and a lower, connected together. The cylinders are inclosed in a casing. When commencing to work, the lower cylinder of each generator is filled with a strong aqueous solution of ammonia. The lower cylinder of the generator also contains a coil of hot-water pipes connected with another coil in the stove $b$. The arrangement of the hot-water-circulating pipes is the same as is usual in closed systems of hot-water-circulating pipes, except that at $c\ c$ are valves by which the hot water may be directed either through the coil in the generator $a'$ or through the coil in the generator $a^2$.

In the diagram, Fig. 9, $u\ u'$ are two coils of pipe which are to be heated by the stove $b$. From the upper end of the coil $u$ a pipe rises to an ordinary expansion-vessel $v$, and from the bottom of this vessel a pipe is led downward to one of the valves $c$. Two pipes pass off from the valve. One of these is shown in full lines, the other in dotted lines. By means of the valve the flow can be directed either through the one pipe or the other. One pipe is made to pass to and fro in the generator $a'$ and the other in the generator $a^2$. After being led out from the generator the pipe is connected to the bottom of the second heating-coil $u'$, and from the top of this coil a pipe is led to the expansion-vessel $v'$, from the bottom of which a pipe descends to the second valve $c$, from which similarly two pipes descend—one to one generator $a'$, the other to the other generator $a^2$—and the pipes after leaving the generators are led to the bottom of the first heating-coil $u$, and so the circuit is completed. In this way if the two valves $c$ are in such a position that there is a free passage through the pipes shown by full lines in the diagram, then the generator $a'$ would be heated; but if the valve $c$ closed the flow through the pipes shown in full lines and left a free passage through the pipes shown by dotted lines then the generator $a^2$ would be heated.

$d\ d$ are pipes by which ammonia gas passes off from the generators when they are heated. It is led upward through coils of pipes $e\ e$, contained within a cistern $f$, and then downward through coils of pipe $e^\times$, contained within a cistern $f^\times$. These cisterns are both kept full of cold water. $g\ g'$ are the liquefiers in which the liquified gas is collected.

It will be understood that only one liquefier acts at a time—i. e., when one vessel is acting as a liquefier the other corresponding vessel is acting as a vaporizer, and each of these vessels is shown as provided with its separate set of circulating-pipes. The liquefier $g$ is provided with pipes $h$, descending from the bottom thereof to a horizontal pipe $h'$, contained in the chamber which it is required to maintain at a low temperature. From the pipe $h'$ rise up coils of pipes $h^2$, and these at their upper ends lead back into the bottom of the liquefier $g$. The liquefier $g'$ is provided with corresponding pipes $h^3$, $h^4$, and $h^5$. The pipes $h$, $h'$, $h^2$, $h^3$, $h^4$, and $h^5$ are always full of liquid ammonia or strong ammonia solution. When pressure decreases in the liquefier $g$, the liquid in the liquefier will be cooled by evaporation and more heat will pass to the liquid in the pipes $h^2$, which rise up to the liquefier, than to the liquid in the pipes $h$, which descend from it, owing to the much larger surface which the pipes $h^2$ present, and consequently a brisk circulation will be set up through the pipes, liquid descending continuously from the liquefier through the pipes $h$ and rising up into it by the pipes $h^2$. A similar operation takes place in pipes $h^3$, $h^4$, and $h^5$.

$i\ i$ are the walls of the chamber, which it is required to maintain at a low temperature. The chamber here shown is meant to be charged with an unfreezable liquid, and vessels containing articles to be frozen are plunged into this liquid; but the construction of the chamber will be varied to suit the purpose for which it is to be applied. When evaporation is taking place in the liquefier $g$, for instance, an energetic circulation is at once set up in the corresponding circulating-pipes $h\ h'\ h^2$, as above explained, and the cold liquor or condensed gas passing through the pipes cools the chamber and its contents. The coils are so arranged that whichever liquefier is for the time in action the chamber $i$ will be cooled with approximate uniformity in every part. Each liquefier $g$ and $g'$ is provided with an overflow $k$, which conveys back to the generator any surplus liquid which may be distilled over. This overflow $k$ has its entrance near the bottom of the liquefier, for the liquefied gas when pure is lighter than when mixed with water. By this arrangement the heavier and less pure liquor is first returned.

When the temperature and pressure in the generator has been raised sufficiently high, the heat is withdrawn, and to hasten the cooling water is showered over it. This is effected automatically in the following manner: The valves $c\ c$, as previously stated, have to be shifted in order to divert the hot-water circulation from one generator to the other. In addition, a cock $l$ has to be put over, in order to apply a cold-water shower to the generator which requires it. The water is drawn by the pipe $m$ from the cisterns $f$, and the cock $l$ directs it into one or other of two perforated pipes I, which pass along the tops of the generators, so that when the cock is in one position the generator $a'$ receives a shower of cold water, and when the cock is in the other position the generator $a^2$ is similarly cooled. The vapor produced in the casings around the generators by the sprinkling operation is led off by the flue-pipe $x$.

The upper cylinder of each generator carries at its end a bracket M, and on the top of the bracket a cranked lever $n$ is mounted. The shorter and upright arm of this lever is connected by a rod $o$ with the farther end of the generator. When the generator is heated, it elongates, carrying the bracket M and lever $n$ with it; but the rod $o$, not being exposed to the heat, does not expand. Consequently the lever $n$ turns about its axis and its longer or horizontal arm is depressed. A link connects the longer arm of the lever $n$ with the shorter arm of another lever $p$ on the bracket, which is thus moved through a larger angle. Similarly the lever $p$ actuates another lever $q$, and the lever $q$ is connected with an arm $r'$ on the hollow axis $r$. There is a disk $r^2$ on the same axis, and this disk carries a pin $r^3$.

Between the two disks $r^2$ there is an arm $s$, with a weight $s'$ attached. The axis on which this arm is mounted passes through the hollow axes $r\ r$ and is carried in bearings upon the two brackets M. When in consequence of the heating of the generator one of the disks $r^2$ is turned, as already described, the pin $r^3$ upon it picks up the weighted arm $s$ and presently carries it over the center, when it falls to the other side. The weight $s'$ has two pins $s^2$ $s^2$ projecting from it, one on either side, and these are received into slots in the links $t$ and $u$. These links are connected, as shown, with the valves $c$ and the cock $l$, and so the positions of these are reversed by the fall of the weight $s'$. When this takes place, the generator, which was previously heated by the flow of hot water through the coil of pipes which it contains, is now cooled by a shower of water over it, while at the same time the hot-water current is diverted from this generator to the other.

It will be seen from the foregoing description that my apparatus embodies in its organization and operation the following among other distinguishing characteristics: I generate the gas in one vessel by separating it from the fluid holding it in solution, liquefy it under pressure in another vessel, and then refrigerate the articles, vessel, or chamber desired by causing this liquefied gas (while being evaporated) to circulate through pipes or passages passing from and back to the vessel in which the liquefied gas was collected, together with liquid with which the pipes were previously filled.

My apparatus is duplex, each section acting intermittently to produce a continuous operation by automatically throwing the heating apparatus of each section into and out of action.

My improvements enable me to dispense with pumps and much of the mechanism, my apparatus being simple and automatic in operation.

Having thus fully described the organization and operation of my improved refrigerating apparatus, what I claim therein as new and of my own invention is—

1. The combination, substantially as hereinbefore set forth, of a vessel acting at one time as a liquefier and afterward as a vaporizer, circulating pipes or passages constituting with said vessel a conduit system for the circulation of a liquefied gas, and a chamber or vessel in which said pipes are inclosed, so that said chamber or vessel is cooled by the direct action of the liquefied gas, itself circulating through pipes therein, as set forth.

2. The combination, substantially as hereinbefore set forth, of the generator, heating apparatus therefor, a vessel acting as a liquefier and afterward as a vaporizer connected with the generator, pipes or passages directly connected with said liquefying and vaporizing vessel and constituting with the generator and said vaporizing and liquefying vessel a closed conduit system for the circulation of a liquefied gas, and a freezing chamber or vessel in which said pipes are inclosed, the organization being such that gas is alternately developed by the heat of the generator liquefied under pressure, evaporated when the heat is withdrawn and the pressure falls, and is circulated as a liquefied gas through the pipes or passages contained in the freezing-vessel, as set forth.

3. The combination, substantially as hereinbefore set forth, of a gas-vessel in which liquefied gas is allowed to evaporate, and a system of circulating-pipes (filled with liquid) extending from the vessel and passing back to it, through which circulating-pipes the cold liquid contents of the vessel circulate continuously while evaporation of the liquid contents is going on.

4. The combination, substantially as hereinbefore set forth, of the generator, heating and cooling apparatus acting alternately thereon, a liquefier and vaporizer connected with the generator, and a system of circulating-pipes (filled with liquid) extending from the liquefier and vaporizer and passing back to it, the circulating-pipes, liquefier, and generator forming one hermetically-closed system.

5. In a refrigerative system, the combination, substantially as hereinbefore set forth, of a generator or vessel in which a volatile liquid is first vaporized and afterward absorbed, its heating-pipes, a valve controlling the flow of the heating-fluid therein, automatic valve-controlling mechanism actuated by the expansion of the generator itself when heated to cut off the supply of heating-fluid, and a vessel connected with pipes in which the gas from the generator is first liquefied and afterward vaporized.

6. The combination, substantially as hereinbefore set forth, of the duplex generators, liquefiers or vaporizers, and circulating systems, with a heater-pipe common to both, a valve controlling the flow of the fluid in the pipe, and automatic valve-shifting mechanism actuated by the expansion of the generator itself when heated to cut off the heat from one generator and transfer it to the other, as herein set forth.

7. The combination, substantially as hereinbefore set forth, of duplex generators, their separate heater-pipes, a valve controlling the flow of the heating-fluid therein, a water-supply pipe for cooling the generators, its valve, and automatic valve-shifting mechanism actuated by the expansion of the generator when heated, adapted to shift the hot-water supply from one generator to the other and to turn on the cold-water supply to that generator from which the hot water was withdrawn.

LOFTUS PERKINS.

Witnesses:
   JNO. H. WHITEHEAD,
    24 *Southampton Buildings, London.*
   T. F. BARNES,
    17 *Gracechurch Street, London.*